(12) United States Patent
Aubert et al.

(10) Patent No.: US 9,356,990 B2
(45) Date of Patent: *May 31, 2016

(54) PROVIDING ACCESS TO MESSAGE HEADERS

(71) Applicant: International Business Machines Corporation, Armonk, NY (US)

(72) Inventors: Denis Aubert, St. Paul de Vence (FR); Oliver Oudot, Vallauris (FR); Joaquin Picon, St. Laurent du Var (FR); Bernard Y. Pucci, Cagnes sur Mer (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/883,742

(22) Filed: Oct. 15, 2015

(65) Prior Publication Data

US 2016/0036890 A1    Feb. 4, 2016

Related U.S. Application Data

(63) Continuation of application No. 14/046,057, filed on Oct. 4, 2013, now Pat. No. 9,203,687, which is a continuation of application No. 13/886,355, filed on May 3, 2013, now Pat. No. 9,203,686.

(30) Foreign Application Priority Data

Aug. 6, 2012 (GB) .................................. 1213947.3

(51) Int. Cl.
*H04L 29/08* (2006.01)
*H04L 29/06* (2006.01)

(52) U.S. Cl.
CPC ............ *H04L 67/02* (2013.01); *H04L 29/0653* (2013.01); *H04L 69/12* (2013.01); *H04L 69/22* (2013.01)

(58) Field of Classification Search
CPC ....................................................... H04L 69/22
See application file for complete search history.

(56) References Cited

U.S. PATENT DOCUMENTS

| | | | |
|---|---|---|---|
| 7,313,667 B1 | 12/2007 | Pullela et al. | |
| 7,483,994 B1 * | 1/2009 | Stephens ................. | H04L 67/02 707/999.001 |
| 7,603,474 B2 | 10/2009 | Stern | |
| 7,644,165 B2 | 1/2010 | Bessis et al. | |
| 7,921,070 B2 | 4/2011 | Batteram | |
| 8,108,540 B2 * | 1/2012 | Allen ...................... | G06F 9/541 707/802 |
| 8,902,886 B2 * | 12/2014 | Franke .................... | H04L 69/22 370/389 |

(Continued)

OTHER PUBLICATIONS

Wheeler, Application No. GB1213947.3, Search Report, dated Nov. 29, 2012, 3 pages.

(Continued)

*Primary Examiner* — Lashonda Jacobs
(74) *Attorney, Agent, or Firm* — Douglas A. Lashmit; Hoffman Warnick LLC

(57) ABSTRACT

Method and system are provided for providing access to string-based message headers in network protocol messages. The method includes: converting header names into canonical form, wherein a canonical key represents at least one equivalent header name, and wherein a canonical key has a string and an integer value; providing a mapping between the header names and the canonical keys; and searching for a header name using the canonical key by sequential search using integer comparison.

19 Claims, 9 Drawing Sheets

(56) References Cited

U.S. PATENT DOCUMENTS

| | | | |
|---|---|---|---|
| 2003/0069941 A1 | 4/2003 | Peiffer | |
| 2006/0123425 A1* | 6/2006 | Ramarao | G06F 9/546 |
| | | | 719/313 |
| 2007/0104326 A1* | 5/2007 | Feigenbaum | G06F 21/6227 |
| | | | 380/44 |
| 2007/0150604 A1* | 6/2007 | Batteram | H04L 69/22 |
| | | | 709/228 |
| 2008/0098020 A1* | 4/2008 | Gupta | G06F 17/30911 |
| 2008/0294971 A1* | 11/2008 | Allen | H03M 7/30 |
| | | | 714/819 |
| 2008/0310312 A1 | 12/2008 | Acharya et al. | |
| 2010/0272124 A1* | 10/2010 | Chen | H03M 13/2909 |
| | | | 370/474 |
| 2010/0272125 A1 | 10/2010 | Franke et al. | |
| 2012/0005373 A1 | 1/2012 | Nitta | |

OTHER PUBLICATIONS

Vlaeminck et al., "Efficient packet classification on network processors", International Journal of Communication Systems, vol. 21, Issue 1, pp. 51-72, Jan. 2008.

Office Action for U.S. Appl. No. 13/886,355, dated May 21, 2015, 13 pages.

Notice of Allowance and Fee(s) Due for U.S. Appl. No. 13/886,355, dated Jul. 23, 2015, 12 pages.

Office Action for U.S. Appl No. 14/046,057, dated May 26, 2015, 14 pages.

Notice of Allowance and Fee(s) Due for U.S. Appl. No. 14/046,057, dated Jul. 22, 2015, 12 pages.

\* cited by examiner

PROVIDING ACCESS TO MESSAGE HEADERS

TECHNICAL FIELD

This invention relates to the field of access to message headers. In particular, the invention relates to providing fast access to string-based message headers in network protocol messages.

RELATED ART

Access to header fields of messages based on HTTP (Hypertext Transfer Protocol) format, in particular SIP (Session Initiation Protocol), is processor intensive as the header names are case insensitive, multi-valued, ordered, and possibly accessed with aliases. Processing of messages themselves may take an important part of processor usage because these headers are heavily used for low-level routing purposes.

The HTTP (Hypertext Transfer Protocol) message format is widely used:

For HTTP protocol and its direct descendants such as SOAP (Simple Object Access Protocol) and REST (Representational state transfer) for Web Services; and For protocols based on the same format, such as SIP (Session Initiation Protocol).

The following is a summary of HTTP message format. The HTTP generic message format is as follows:

```
<start-line>
<message-headers>
<empty-line>
[<message-body>]
[<message-trailers>]
```

EXAMPLE

INVITE sip:bob@192.0.2.4 SIP/2.0
Via: SIP/2.0/UDP server10.biloxi.com; branch=z9hG4bK4b43c2ff8.1
Via: SIP/2.0/UDP bigbox3.site3.atlanta.com; branch=z9hG4bK77ef4c2312983.1; received=192.0.2.2
Via: SIP/2.0/UDP pc33.atlanta.com; branch=z9hG4bKnashds8;received=192.0.2.1
Max-Forwards: 68
To: Bob <sip:bob@biloxi.com>
From: Alice <sip:alice@atlanta.com>;tag=1928301774
Call-ID: a84b4c76e66710
CSeq: 314159 INVITE
Contact: <sip:alice@pc33.atlanta.com>
Route: <sip:p4.domain.com;lr>
Route: <sip:p3.middle.com>
Route: <sip:p2.example.com;lr>
Route: <sip:p1.example.com;lr>
Content-Type: application/sdp
Content-Length: 142

The following are some characteristics of message headers:

Message header names are NOT case sensitive;
  Content-Length=content-length=cOnTeNt-LeNgTh
In SIP, there are also aliases for many headers;
  Content-Length=content-length=cOnTeNt-LeNgTh=l=L Some headers may have multiple occurrences (for example, Via, Route, etc.);
Same name may appear with different cases;
Order of headers must be preserved; and
Messages may contain dozens of headers (in particular with SIP).

In a conventional implementation, message headers are stored as an ordered table of key/value pairs. Searching a header is generally done with a sequential search in the headers list with an ignoring case string comparison. In the case of a possible alias, the search is done again with the alias value. However, performance is not very good due to different header name representations.

SUMMARY

According to a first aspect of the present invention there is provided a method for providing fast access to string-based message headers in network protocol messages, comprising: converting header names into canonical form, wherein a canonical key represents at least one equivalent header name, and wherein a canonical key has a string and an integer value; providing a mapping between the header names and the canonical keys; and enabling searching for a header name using the canonical key by sequential search using integer comparison.

In embodiments, the present invention further provides a method wherein providing a mapping between the header names and the canonical keys comprises mapping the header names of the following forms to the canonical key: a standard representation of the header name which is its canonical string; a lower-case representation of the header name; and a lower-case representation of any alias versions of the header name.

In embodiments, the present invention further provides a method comprising: initializing a converter by converting predefined header names for a protocol to canonical keys and building the mapping.

In embodiments, the present invention further provides a method comprising: associating an integer value with a canonical key by using a memory address for a canonical header string as the integer value.

In embodiments, the present invention further provides a method comprising: associating an integer value with a canonical key by using a table to store all canonical header strings and using the index of the table as the integer value.

In embodiments, the present invention further provides a method comprising storing the canonical key and its lower-case representation as map keys, and the canonical key as a map value.

In embodiments, the present invention further provides a method comprising updating the mapping of canonical keys to include new representations of existing predefined header names.

In embodiments, the present invention further provides a method comprising updating the mapping of canonical keys to include new header names received which are not in the initialized predefined header names of the protocol.

In embodiments, the present invention further provides a method comprising: receiving a message having a message header of header names; and converting the header names to canonical keys; and building a message header list for the message of the canonical keys.

In embodiments, the present invention further provides a method wherein converting header names, further comprises: searching the header name directly in the mapping; and if found, getting the associated value; if not found, converting the header name to lower-case and searching the mapping; if found, adding the new representation to the mapping for subsequent searches; if not found, adding the header name to the mapping with the new header name as a new canonical key.

In embodiments, the present invention further provides a method comprising: receiving a header name to be searched; and searching for the canonical key in the message header list of a message using integer comparison.

In embodiments, the present invention further provides a method comprising: receiving a header name to be searched; converting the header name to its canonical key using the mapping; and searching for the canonical key in the message header list of a message using integer comparison.

According to a second aspect of the present invention there is provided a system for providing fast access to string-based message headers in network protocol messages, comprising: a converter for converting header names into canonical form, wherein a canonical key represents at least one equivalent header name, and wherein a canonical key has a string and an integer value; a map for providing a mapping between the header names and the canonical keys; and a header search component for searching for a header name using the canonical key by sequential search using integer comparison.

In embodiments, the present invention further provides a system wherein the map for providing a mapping between the header names and the canonical keys comprises: a standard representation of the header name which is its canonical string; and a lower-case representation of the header name; a lower-case representation of any alias versions of the header name.

In embodiments, the present invention further provides a system comprising an initializing component for initializing the converter by converting predefined header names for a protocol to canonical keys and building the map.

In embodiments, the present invention further provides a system wherein the map stores the canonical key and its lower-case representation as map keys, and the canonical key as a map value.

In embodiments, the present invention further provides a system comprising an updating component for updating canonical keys to include new representations of existing predefined header names.

In embodiments, the present invention further provides a system comprising an updating component for updating canonical keys to include new header names received which are not in the initialized predefined header names of the protocol.

In embodiments, the present invention further provides a system further comprising: a message header converting component for receiving a message having a message header of header names, and including: a look-up component for converting the header names to canonical keys; and a list building component for building a message header list for the message of the canonical keys with integer values.

In embodiments, the present invention further provides a system comprising: a header search component comprising: a key receiving component for receiving a header name to be searched; a converting component for converting the header name to its canonical key using the mapping; and a sequential search component for searching for the canonical key in the message header list of a message using integer comparison.

According to a third aspect of the present invention there is provided a computer program product for providing fast access to string-based message headers in network protocol messages, the computer program product comprising a computer readable storage medium having computer-readable program code embodied therewith, the computer-readable program code configured to: convert header names into canonical form, wherein a canonical key represents at least one equivalent header name, and wherein a canonical key has a string and an integer value; provide a mapping between the header names and the canonical keys; and enable search for a header name using the canonical key by sequential search using integer comparison.

According to a fourth aspect of the present invention there is provided a method substantially as described with reference to the figures.

According to an fifth aspect of the present invention there is provided a system substantially as described with reference to the figures.

The described aspects of the invention provide advantages including a reduced memory footprint, a header name comparison reduced to integer comparison, and an automatic normalization of header names.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Embodiments of the present invention will now be described, by way of example only, with reference to the following drawings.

DETAILED DESCRIPTION

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Methods and systems are provided for a front-end key converter that quickly transforms any header key into a canonical form. A canonical form represents equivalence classes only once, with a canonical key representing a class of one or multiple equivalent header keys.

When a message is read from an input stream, the header key or name is read and transformed into a unique canonical key by a front-end converter. This canonical key may be accessed as a string or as an integer. A simple implementation is to have this key as an address that points to the string and use this address as an integer for comparison. Another implementation may be to use an integer that is an index in a table of strings to retrieve the sting form of the header name.

To search for a known predefined header key (for example, Content-Length), a sequential search is made over headers using directly the canonical keys that are stored as a program constant. This allows an integer comparison instead of string comparison.

To search for a dynamic/private header, first the header key is converted into its canonical key, then the search is carried out as for known predefined header keys.

Figure 1A:
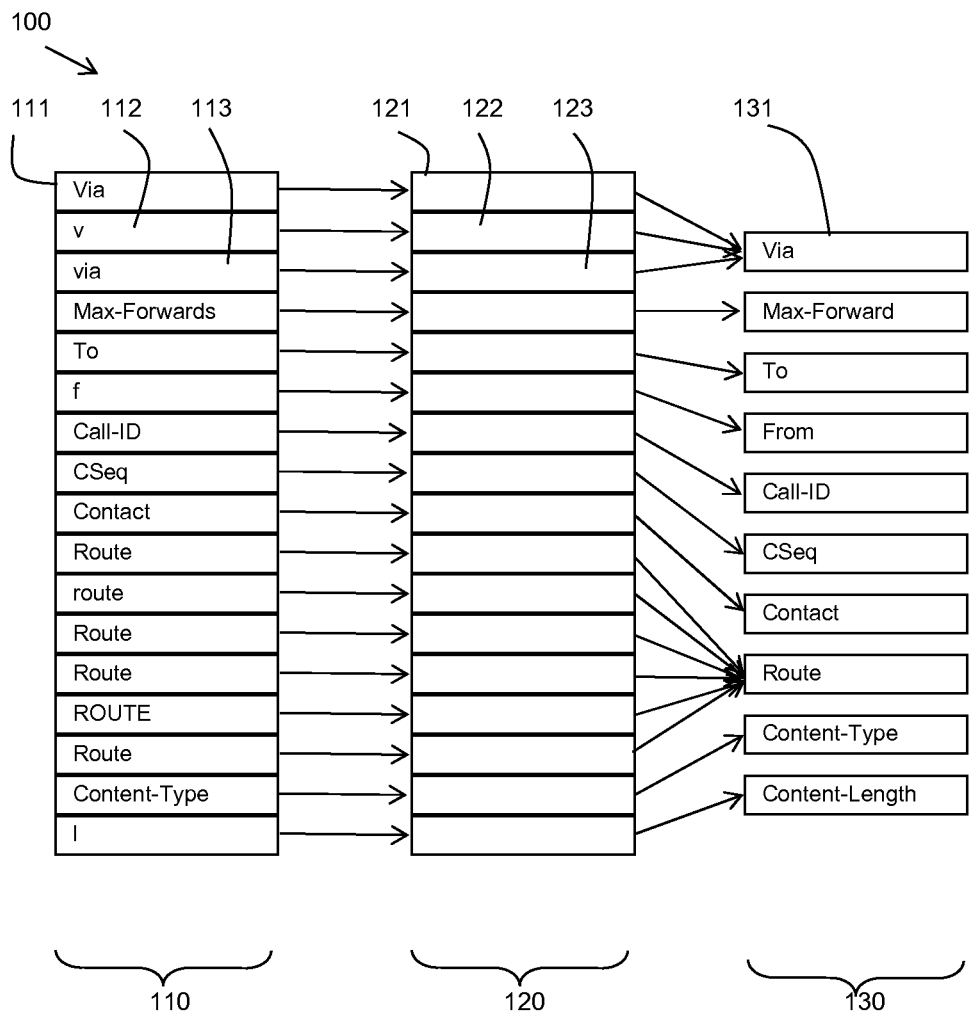
FIGS. 1A and 1C are schematic diagrams showing conversion of message headers to canonical form in accordance with embodiments of the present invention.

Referring to FIG. 1A, a schematic diagram 100 shows the transformation from received message header keys 110 to integer keys 120 to a canonical form in the form of a unique set of canonical keys 130 which are reused for all messages. From a header key 110 expressed as a string, the transformation returns a canonical key 130 in two representations: as a string, and as an integer. The integer keys 120 may be an index in a canonical form table, or, more simply, directly the address of the canonical key strings.

For example, using the message headers shown in FIG. 1A, the three equivalent header keys of "Via" 111, "v" 112, "via" 113, all transform the same integer key 121, 122, 123 which refers to the unique canonical form key "Via" 131.

Figure 1B:
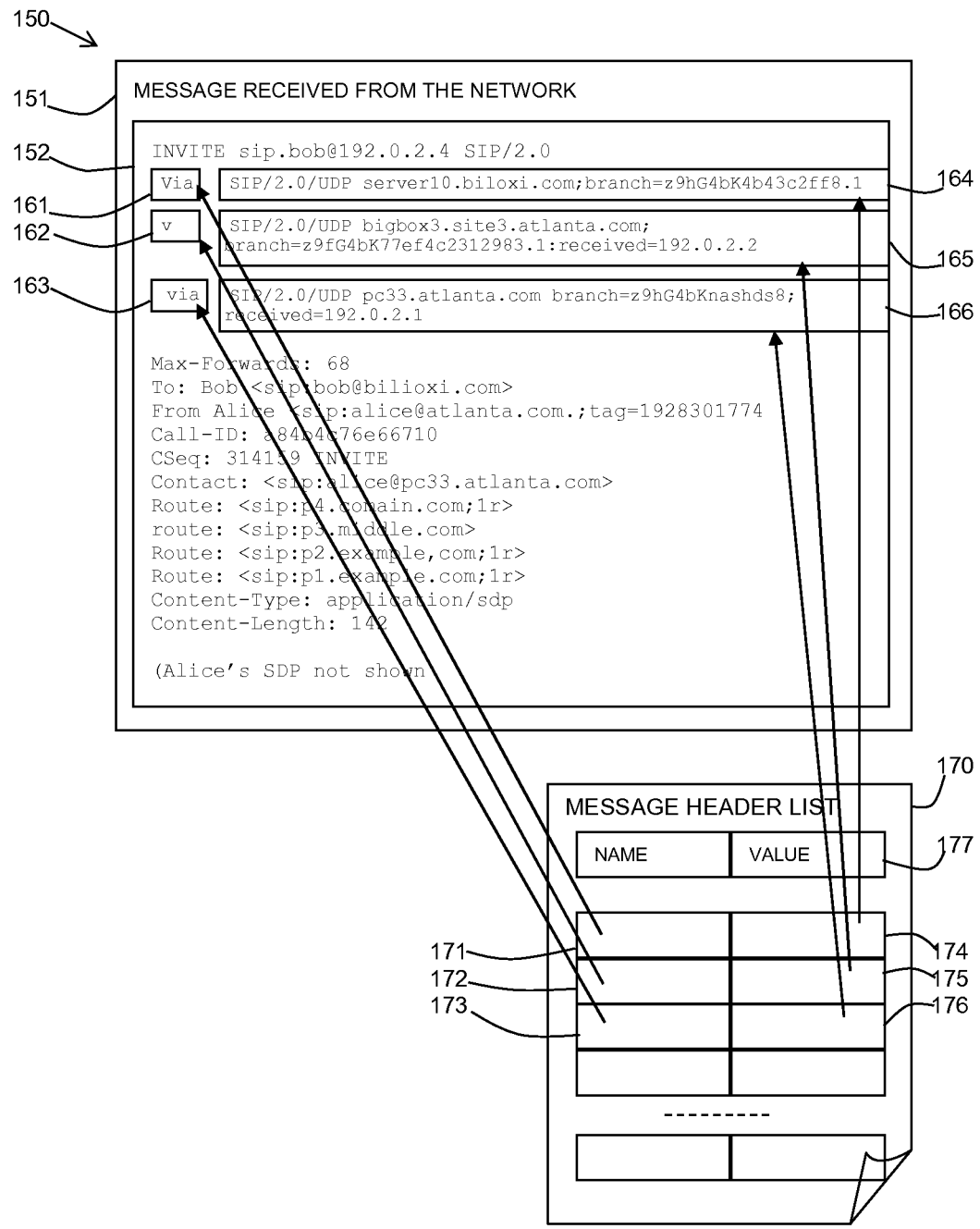
FIG. 1B is a schematic diagram showing processing of message headers as known in the prior art.

Referring to FIG. 1B, a schematic diagram 150 shows message header processing as known in the prior art. A message 151 received from a network is read from an input stream generally attached to the network. A message header 152 may include headers as shown in FIG. 1B. Three of the header names 161-163 have been highlighted together with their values 164-166 to illustrate the processing.

An internal logical representation of the message is built including a message header list 170 with a list of key/value pairs 177 to represent the headers. The header names (or keys) 171-173 of the message header list 170 point to the header names 161-163 on a duplicate copy of the message 151 in memory, which means that each header name is in a different memory area, even if the text content is identical. The header values 174-176 of the message header list 170 point to the values 164-166 in the message 151.

In the internal message representation, when a particular header name is required to be searched, then the required string must be compared with all the strings. Additionally, any alias names must also be checked.

In the example of FIG. 1B, if a search is required for the header name "Via", this string should match each of the headers "Via" (the same representation), "via" (the lower-case representation), and "v" (the alias). A header name being searched for must be compared to all the headers in the list, as it could be at the end of the list.

Figure 1C:
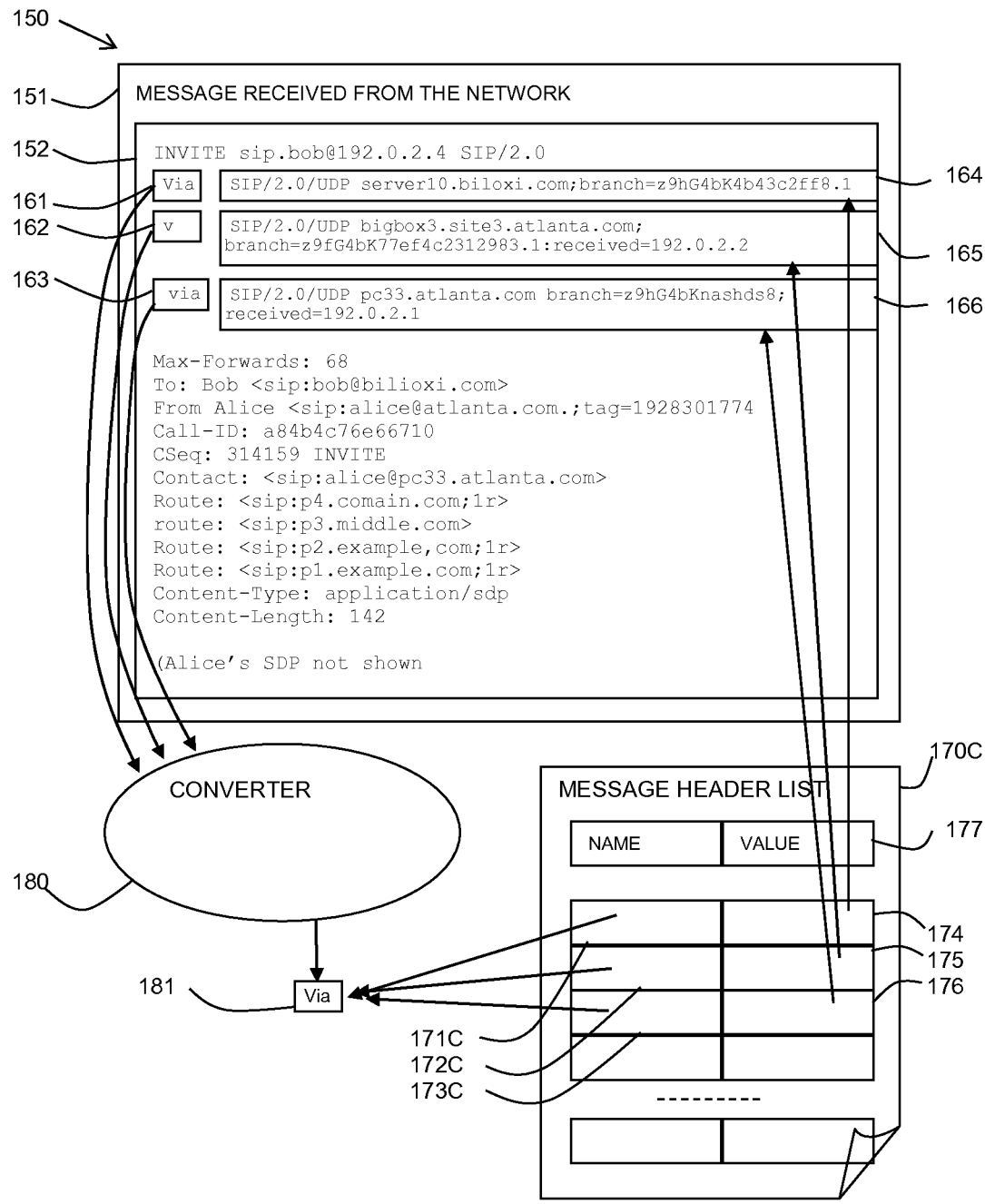

Referring to FIG. 1C, an equivalent schematic diagram 150 shows a described message header processing.

A converter 180 is provided to quickly convert all the header names which are physically different but semantically identical to a unique canonical key 81 always located a the same memory area with the same address. The message header list 170C which is built for a message 151 is then always using the same key 171C-173C for all header names that are semantically identical. Moreover, as the same converter is used for all messages, the same canonical key 181 may be used for all messages that are processed with it.

To increase the speed of comparison of header keys, an integer key value is associated to each canonical header name. Two possible ways to do this include:

1) Using directly the memory address of the canonical header string as the integer. In this case, the integer value is something "random" that depends on where the string has been placed in memory by the program, but it is enough to allow a fast key comparison. An advantage of this embodiment is that if it is considered as the address of the string, then the string is provided, or if it is considered as an integer, it allows efficient comparisons.

2) Using an intermediate table or array that stores all canonical header strings, and uses the index in this table or array as the canonical key integer. In such case, the header keys will be integers from zero to the total number of header names. An advantage of this embodiment is that the format of the integer can be short; however, there is an indirection to access the string associated to the integer.

The selection of the method of association of the integer value depends on the implementation context.

A front-end key converter may be provided as a hash-map that links the different forms of a message header key to its canonical key. To speed up the access, an integer key value may be associated to each canonical header name which is used for header searches. From a header name expressed as a string, the converter may return a canonical key in two representations: as a string, and as an integer. The integer key may be an index in the canonical form table, or may simply be the address of the canonical key.

The front-end converter is initialized for all predefined message headers of the protocol. The canonical form of the message header key and its lower-case representation are used as map keys, and the canonical form as map value. If there is an alias, the alias in lower case is also added to the map.

Figure 2:
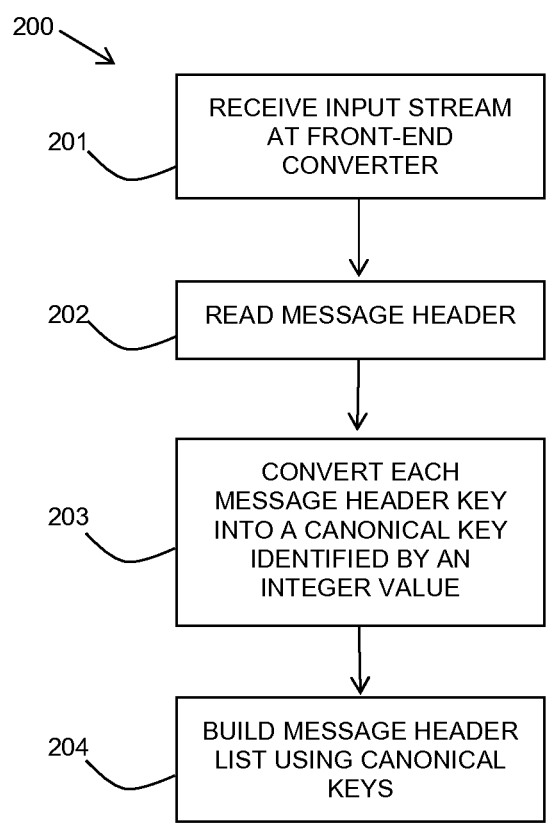
FIG. 2 is a flow diagram of a method in accordance with embodiments of the present invention.

Referring to FIG. 2, a flow diagram 200 shows an example embodiment the described method for message header conversion to provide fast access to message headers as carried out by a front-end converter An input stream may be received 201 at a front-end converter. A message header key may be read 202 by the front-end converter and each message header key may be converted 203 into a canonical key identified by an integer value.

A message header list for the message may be built 204 using the canonical keys of the dual form of integer and string.

Figure 3:
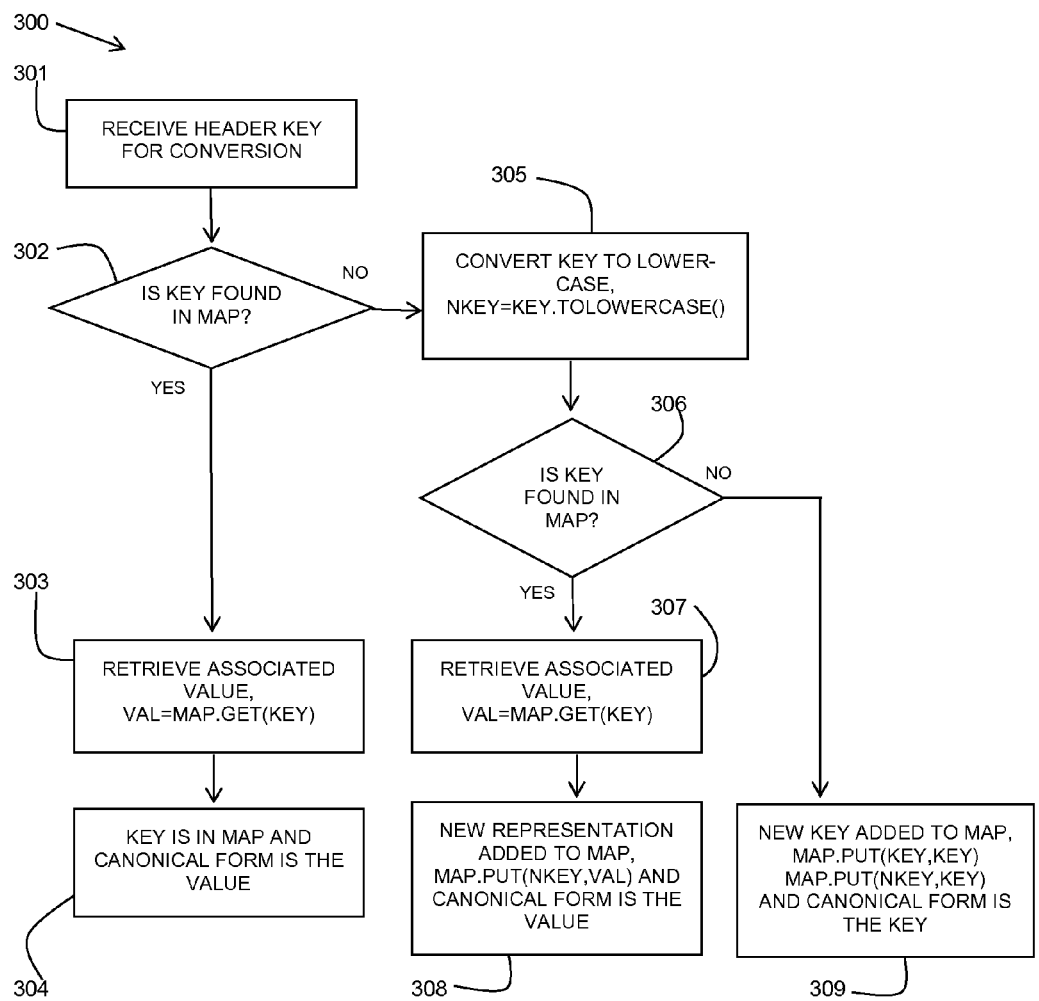
FIG. 3 is a flow diagram of a method in accordance with embodiments of the present invention.

Referring to FIG. 3, a flow diagram 300 shows an example embodiment of an aspect of the described method of message header conversion to provide fast access to message headers as carried out by a front-end converter.

A header key may be received and input 301 for conversion. A search may be carried out for the header key directly in the map. It may be determined 302 if the key is found and, if so, the associated value may be retrieved 303 from the map, val=map.get(key). This means that the key is directly in the map and the canonical form is the value 304.

If the key is not found, the header key may be converted 305 to lower-case, nkey=key.toLowerCase( ) It may be determined 306 if the lower-case key is found and, if so, the associated value may be retrieved 307 from the map, val=map.get(key). A new representation of an existing key may then be added 308, map.put(nkey, val) and the canonical form is the value.

If they key is not found in the lower-case, it is a new key. The key may be added 309 to the map, as for predefined keys, map.put(key, key), map.put(nkey, key). The first form becomes the canonical form, canonical form=key.

The converter map is self-adaptive and quickly converges to a fix point. All conversions are then done in a single step using a low-cost hash-code function.

Figure 4:
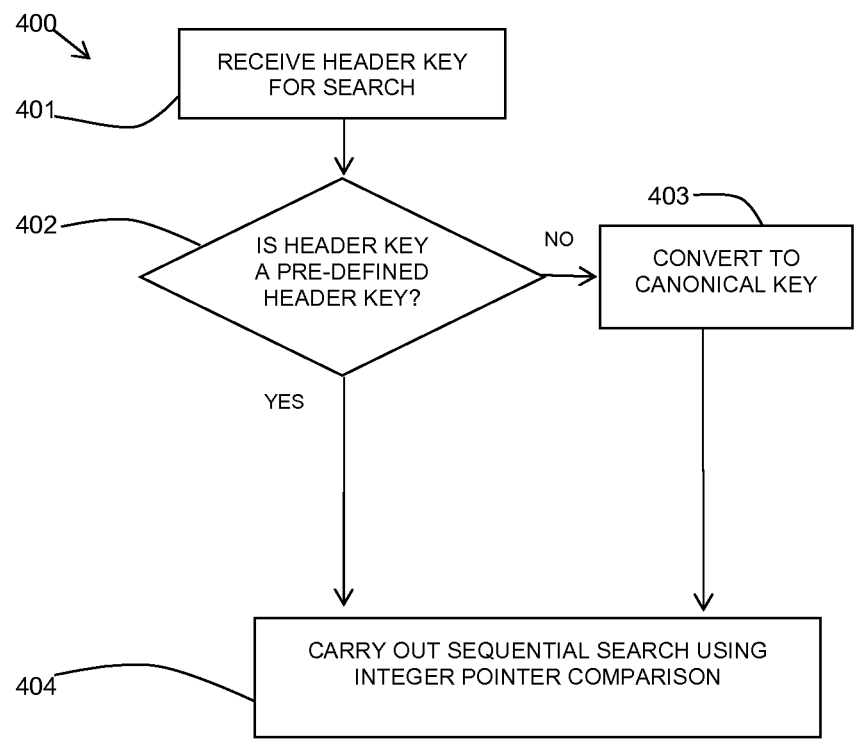
FIG. 4 is a flow diagram of a method in accordance with embodiments of the present invention.

Referring to FIG. 4, a flow diagram 400 an example embodiment of an aspect of the described method of searching for a header key. A message may be received and access required to its header. A conversion of the message's header keys to canonical keys referenced by integer values will have been carried out on the message to provide a message header list for the message.

A header key may be received 401 for a search. It may be determined 402 by the front-end converter if the header key is a known predefined header key (for example, Content-Length). If so, a sequential search may be made 404 over the message header list of the message using directly the canonical keys that are stored. This allows an integer comparison instead of string comparison.

If a header key is not a predefined header key, for example, it may be a dynamic/private header, the header key may be converted 403 by the front-end converter into its canonical key and then the search may be carried out 404 of the message header list as for known predefined header keys.

When a message is received, all its header names are converted to integer keys corresponding to canonical keys before being delivered to the application. When the application wants to retrieve header values from this message, there are several possibilities:

1) The application uses a predefined method (for example msg.getContentLength( ) that directly uses the canonical key of the header to search for. In such case, which may be the default usage, the front-end key converter is not involved because the header key is already converted.

2) The application uses a generic method that retrieves a header using its name as a string (for example msg.getHeader ("COntENt-LengTH")). In this case, the front-end key converter must be used first to convert the string into header key prior to search for the header.

3) The application is searching for a non-standard header that is not predefined by the protocol. This case is similar to Case 2 because only the string representation must be used at least the first time. The front-end key converter is updated to increase the speed of subsequent searches.

Figure 5:
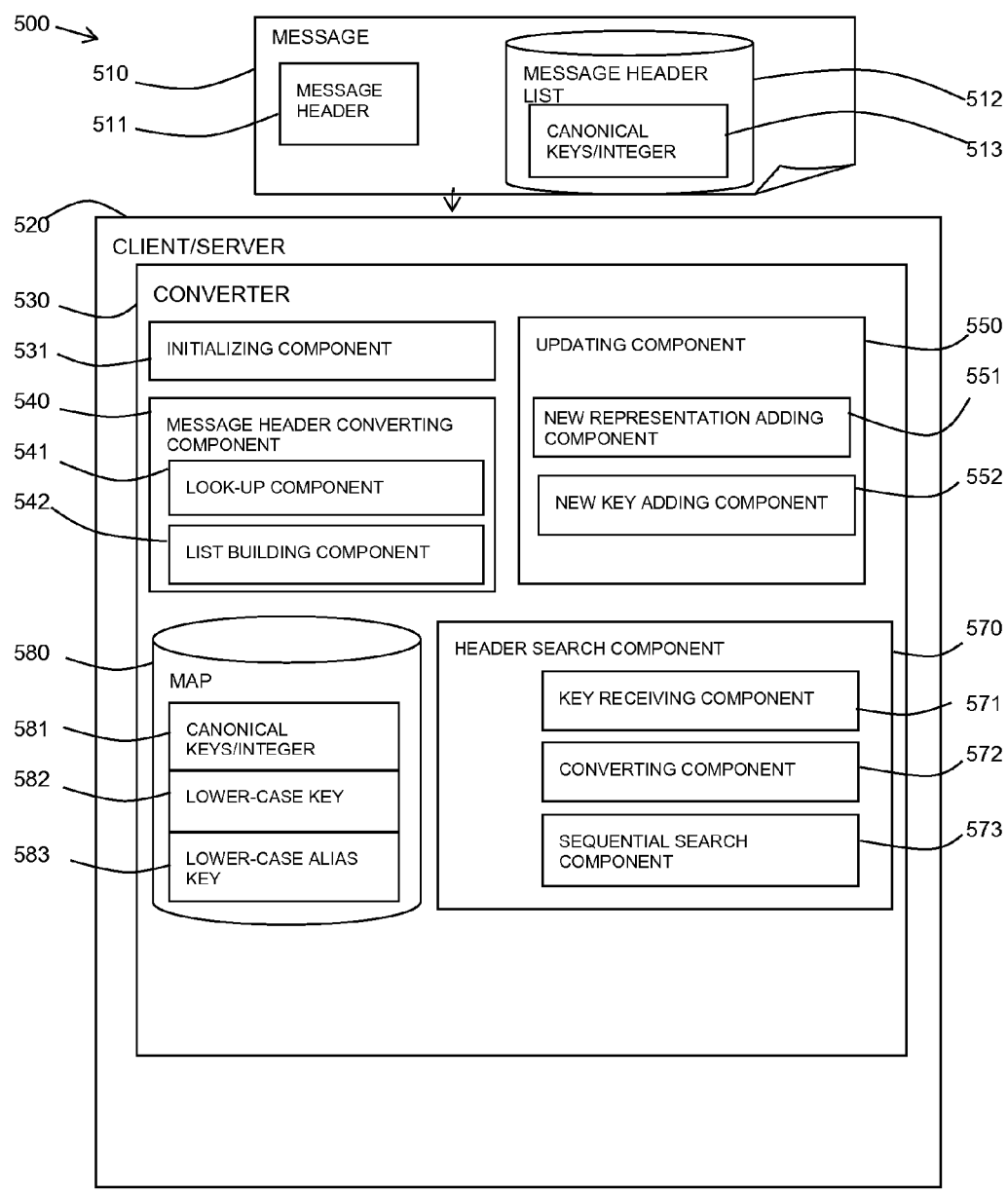
FIG. 5 is a block diagram of a system in accordance with embodiments of the present invention.

Referring to FIG. 5, a block diagram shows an example embodiment of the described system 500.

A message 510 may be received in an input stream in the form of a HTTP message with message header 511.

In the described system 500, a client/server 520 may include a converter 530 for converting message header keys to a canonical form in order to provide fast access to the message headers when searching.

The converter 530 may be implemented in a library dedicated to the protocol that is to be handled (for example, HTTP or SIP). This library is a piece of software that may be directly linked to an application, or provided by some middleware (called "container") in which the application resides.

For example, web applications are deployed inside web servers that provide such libraries to applications. This allows applications to be simplified, and also multiple applications to share the same libraries.

The converter 530 may include an initializing component 531 for initializing the converter 530 for all predefined header keys of the protocol.

The converter 530 includes a map 580 which includes for each header name string: 1) The canonical form 581 of the header name with a referenced integer value; 2) The lower case representation 582 of the header name (or other generalized representation), which is used to retrieve the canonical form in case the header name is given in any mix of upper and lower case. For example, "ViA" will be converted in "via" and then found in the map; and 3) If the header has an alias, the lower case representation of this alias 583.

The converter 530 may include a message header converting component 540 for converting an incoming message header 511 to canonical form and building a message header list 512 using the canonical keys 514 with integer values. The message header converting component 540 may include a look-up component 541 for looking up header names read from the message header 511 in the map 580. The look-up component 541 may use the canonical form 581 or the lower case form 582 to find the header name in the map 580. A list building component 542 may build the message header list for the message formed of the retrieved canonical keys and integer values 514 obtained from the map 580.

The converter 530 may also include an updating component 550 for updating the map 580 to include a new header name discovered in a message 510 and additional mappings and canonical keys which were not input during initialization of the converter 530.

The updating component 550 may be triggered by the look-up component 541 if a message header name is not found in the map 580. A new representation adding component 551 may be provided for adding a new representation to the map 580 if the lower-case search matched but the actual representation was not previously mapped to the canonical key 581. A new key adding component 552 may be provided for adding a new canonical key 561 to the map 580 if the search did not locate a match.

A header search component 570 may be provided for carrying out a search for message header keys.

The header search component 570 may include a key receiving component 571 for receiving a header key to search for in a message header 511. A converting component 572 may convert the header key to its canonical form and a sequential search component 573 may carry out a search using the canonical form of the message header list 512.

Figure 6:
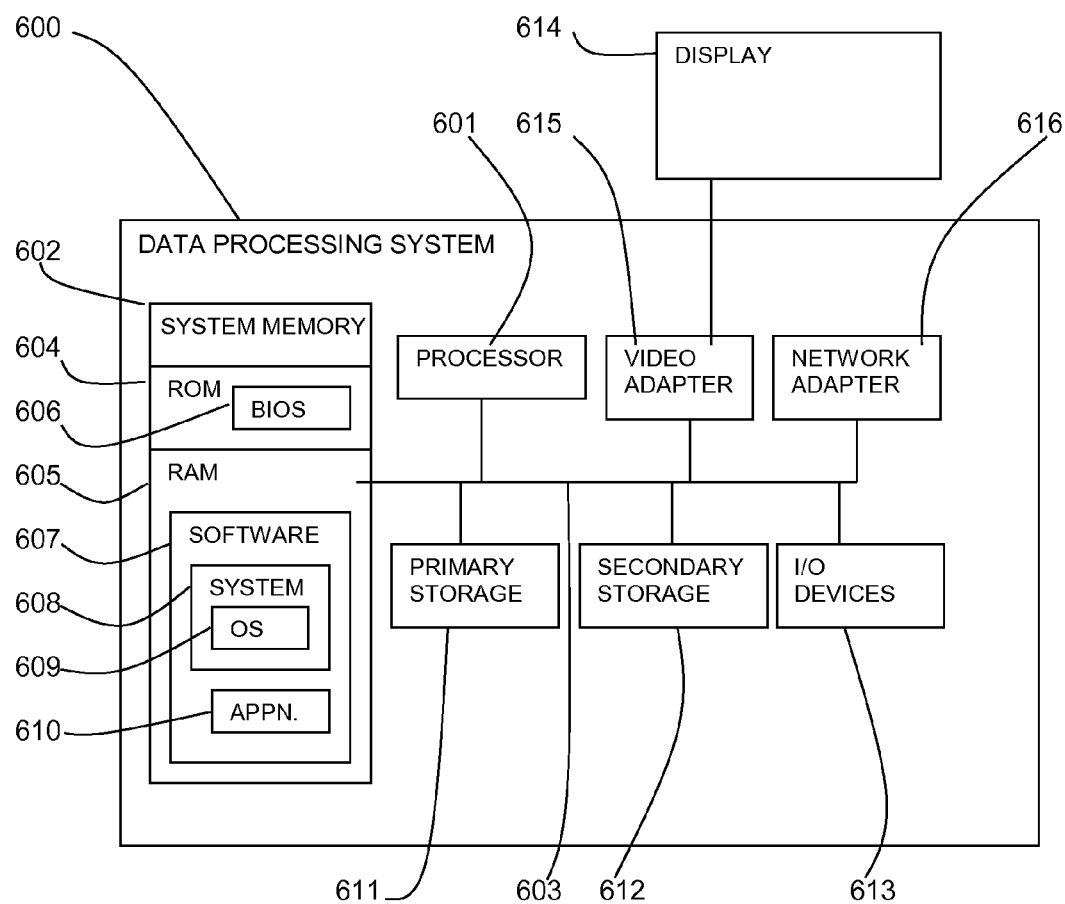
FIG. 6 is a block diagram of a computer system in which the present invention may be implemented.

Referring to FIG. 6, an exemplary system for implementing aspects of the invention includes a data processing system 600 suitable for storing and/or executing program code including at least one processor 601 coupled directly or indirectly to memory elements through a bus system "603. The memory elements may include local memory employed during actual execution of the program code, bulk storage, and cache memories which provide temporary storage of at least some program code in order to reduce the number of times code must be retrieved from bulk storage during execution.

The memory elements may include system memory 602 in the form of read only memory (ROM) 604 and random access memory (RAM) 605. A basic input/output system (BIOS) 606 may be stored in ROM 604. System software 607 may be stored in RAM 605 including operating system software 608. Software applications 610 may also be stored in RAM 605.

The system 600 may also include a primary storage means 611 such as a magnetic hard disk drive and secondary storage means 612 such as a magnetic disc drive and an optical disc drive. The drives and their associated computer-readable media provide non-volatile storage of computer-executable instructions, data structures, program modules and other data for the system 600. Software applications may be stored on the primary and secondary storage means 611, 612 as well as the system memory 602.

The computing system 600 may operate in a networked environment using logical connections to one or more remote computers via a network adapter 616.

Input/output devices 613 may be coupled to the system either directly or through intervening I/O controllers. A user may enter commands and information into the system 600 through input devices such as a keyboard, pointing device, or other input devices (for example, microphone, joy stick, game pad, satellite dish, scanner, or the like). Output devices may include speakers, printers, etc. A display device 614 is also connected to system bus 603 via an interface, such as video adapter 615.

Figure 7:
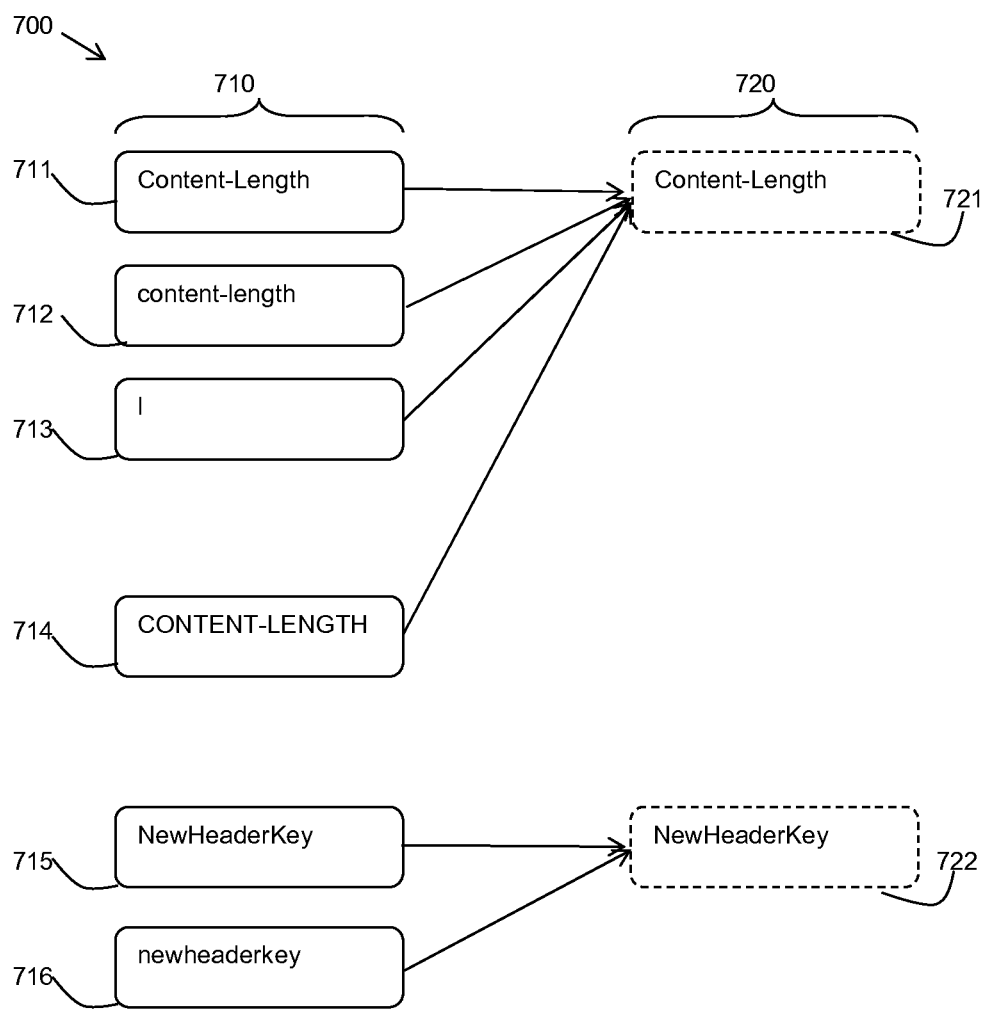
FIG. 7 is a schematic diagram of a method in accordance with a embodiments of the present invention.

Referring to FIG. 7, a schematic diagram 700 illustrates the mapping of header keys 710 to canonical keys 720. During initialization of a converter, predefined header keys, for example, "Content-Length" in the standard form 711, are converted to a canonical key, for example, "Content-Length" 721. The lower-case form 712 of the canonical key 721 is also stored for searching purposes. Any aliases, for example, "l" are also stored in lower-case form 713.

If a new representation of a header key comes in, for example, "CONTENT-LENGTH" 714, it is converted into lower-case form to find the canonical form, in this case "Content-Length" 721. The new representation 714 is added to the map to increase the speed of a future search with this representation.

When a new header key comes in, for example, "New-HeaderKey" 715, the new format is used as the new canonical key, in this case "NewHeaderKey" 722, and its lower-case representation, in this case "newheaderkey" 716 is added to allow future search of other representations of the same key.

This invention proposes a method allowing access to header fields of messages based on HTTP format (in particular SIP), where header names are case insensitive, multi-valued, ordered and possibly accessed with aliases.

The solution is based on a front-end key normalization map allowing quick retrieval of a normalized form of the header name from any other of its variants (including alias). Then the header search is based on a simple integer comparison instead of string comparison.

The described solution is particularly valuable in SIP engines such as an IMS CSCF (IP Multimedia Subsystem Call Session Control Function) where thousands of messages have to be processed every second, each one with several dozens of headers.

The described method may also be self-adaptive for possible "private" keys not in the list of keys defined by the protocol.

The solution is applicable to all data structures that use a such case insensitive attribute naming convention, such as Internet mail.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A method, comprising:
   converting header names into a canonical form comprising a plurality of canonical keys, wherein each canonical key represents at least one equivalent header name, and wherein each canonical key has a string and an integer value;
   providing a mapping between the header names and the canonical keys; and
   searching for a header name using the canonical key by sequential search using integer comparison.

2. The method as claimed in claim 1, wherein providing a mapping between the header names and the canonical keys comprises mapping the header names of the following forms to the canonical key:
   a standard representation of the header name which is its canonical string;
   a lower-case representation of the header name; and
   a lower-case representation of at least one alias of the header name.

3. The method as claimed in claim 1, further comprising:
   initializing a converter by converting predefined header names for a protocol to canonical keys and building the mapping.

4. The method as claimed in claim 1, further comprising:
   associating an integer value with a canonical key by using a memory address for a canonical header string as the integer value.

5. The method as claimed in claim 1, further comprising:
   associating an integer value with a canonical key by using a table to store all canonical header strings and using the index of the table as the integer value.

6. The method as claimed in claim 1, further comprising storing the canonical key and its lower-case representation as map keys, and the canonical key as a map value.

7. The method as claimed in claim 1, further comprising updating the mapping of canonical keys to include new representations of existing predefined header names.

8. The method as claimed in claim 1, further comprising updating the mapping of canonical keys to include new header names received which are not in the initialized predefined header names of the protocol.

9. The method as claimed in claim 1, further comprising:
   receiving a message having a message header of header names;
   converting the header names to canonical keys; and
   building a message header list for the message of the canonical keys.

10. The method as claimed in claim 9, further comprising:
    receiving a header name to be searched; and
    searching for the canonical key in the message header list of a message using integer comparison.

11. The method as claimed in claim 9, further comprising:
    receiving a header name to be searched;

converting the header name to its canonical key using the mapping; and searching for the canonical key in the message header list of a message using integer comparison.

12. A system, comprising:
   a converter for converting header names into a canonical form comprising a plurality of canonical keys, wherein each canonical key represents at least one equivalent header name, and wherein each canonical key has a string and an integer value;
   a map for mapping between the header names and the canonical keys; and
   a header search component for searching for a header name using the canonical key by sequential search using integer comparison.

13. The system as claimed in claim 12, wherein the map for providing a mapping between the header names and the canonical keys further comprises:
   a standard representation of the header name which is its canonical string;
   a lower-case representation of the header name; and
   a lower-case representation of at least one alias of the header name.

14. The system as claimed in claim 12, further comprising an initializing component for initializing the converter by converting predefined header names for a protocol to canonical keys and building the map.

15. The system as claimed in claim 12, wherein the map stores the canonical key and its lower-case representation as map keys, and the canonical key as a map value.

16. The system as claimed in claim 12, further comprising at least one of:
   an updating component for updating canonical keys to include new representations of existing predefined header names; and
   an updating component for updating canonical keys to include new header names received which are not in the initialized predefined header names of the protocol.

17. The system as claimed in claim 12, further comprising:
   a message header converting component for receiving a message having a message header of header names, and further comprising:
   a look-up component for converting the header names to canonical keys; and
   a list building component for building a message header list for the message of the canonical keys with integer values.

18. The system as claimed in claim 12, further comprising:
   a header search component further comprising:
      a key receiving component for receiving a header name to be searched;
      a converting component for converting the header name to its canonical key using the mapping; and
      a sequential search component for searching for the canonical key in the message header list of a message using integer comparison.

19. A computer program product stored on a computer readable storage medium for performing a method when executed on a computing device, the method comprising:
   converting header names into a canonical form comprising a plurality of canonical keys, wherein each canonical key represents at least one equivalent header name, and wherein each canonical key has a string and an integer value;
   providing a mapping between the header names and the canonical keys; and
   enabling search for a header name using the canonical key by sequential search using integer comparison.

* * * * *